United States Patent
Heibel

(10) Patent No.: US 11,621,091 B2
(45) Date of Patent: Apr. 4, 2023

(54) TEMPERATURE MEASUREMENT SENSOR USING MATERIAL WITH A TEMPERATURE DEPENDENT NEUTRON CAPTURE CROSS SECTION

(71) Applicant: WESTINGHOUSE ELECTRIC COMPANY LLC, Cranberry Township, PA (US)

(72) Inventor: Michael D. Heibel, Broomfield, CO (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 603 days.

(21) Appl. No.: 16/732,481

(22) Filed: Jan. 2, 2020

(65) Prior Publication Data

US 2020/0219630 A1 Jul. 9, 2020

Related U.S. Application Data

(60) Provisional application No. 62/789,685, filed on Jan. 8, 2019.

(51) Int. Cl.
*G21C 17/112* (2006.01)
*G01T 3/00* (2006.01)
(Continued)

(52) U.S. Cl.
CPC ............ *G21C 17/112* (2013.01); *G01T 3/006* (2013.01); *G01T 3/02* (2013.01); *G01K 11/30* (2013.01); *G21C 17/108* (2013.01)

(58) Field of Classification Search
CPC ....... G21C 17/112; G21C 17/108; G01T 3/02; G01T 3/006; G01K 11/30
(Continued)

(56) References Cited

U.S. PATENT DOCUMENTS 3,375,370 A * 3/1968 Hilborn .................. G01T 3/006
376/153
10,473,510 B2 11/2019 Eoh et al.
(Continued)

FOREIGN PATENT DOCUMENTS

| CN | 107767974 A | 3/2018 |
|---|---|---|
| EP | 0251668 A2 | 1/1988 |

(Continued)

OTHER PUBLICATIONS

International Search Report and Written Opinion for International PCT Application No. PCT/US2020/012024, dated May 22, 2020.

*Primary Examiner* — Jack W Keith
*Assistant Examiner* — Daniel Wasil
(74) *Attorney, Agent, or Firm* — K&L Gates LLP

(57) ABSTRACT

A temperature measurement sensor for use in a nuclear reactor is described. The sensor includes a first neutron detector member and a second neutron detector member. The first neutron detector includes an outer shield material with an effective neutron capture cross section that is temperature dependent. The first neutron detector member outputs a first current signal and the second neutron detector member outputs a second current signal. An electrical connection between the first and second neutron detector members produces a net current that is the difference in current between the first and second signals. The difference is proportional to changes in temperature.

18 Claims, 1 Drawing Sheet

(51) Int. Cl.
*G01T 3/02* (2006.01)
*G21C 17/108* (2006.01)
*G01K 11/30* (2006.01)

(58) Field of Classification Search
USPC .......................................................... 376/247
See application file for complete search history.

(56) References Cited

U.S. PATENT DOCUMENTS

| | | |
|---|---|---|
| 2003/0213917 A1 | 11/2003 | Menlove et al. |
| 2012/0091327 A1 | 4/2012 | Holaday et al. |
| 2017/0023684 A1 | 1/2017 | Inglis et al. |
| 2017/0322328 A1* | 11/2017 | Cha ..................... G21C 17/112 |

FOREIGN PATENT DOCUMENTS

| | | |
|---|---|---|
| JP | 2014122848 A | 7/2014 |
| KR | 101892732 B1 | 8/2018 |
| WO | 2020146183 A1 | 7/2020 |

* cited by examiner

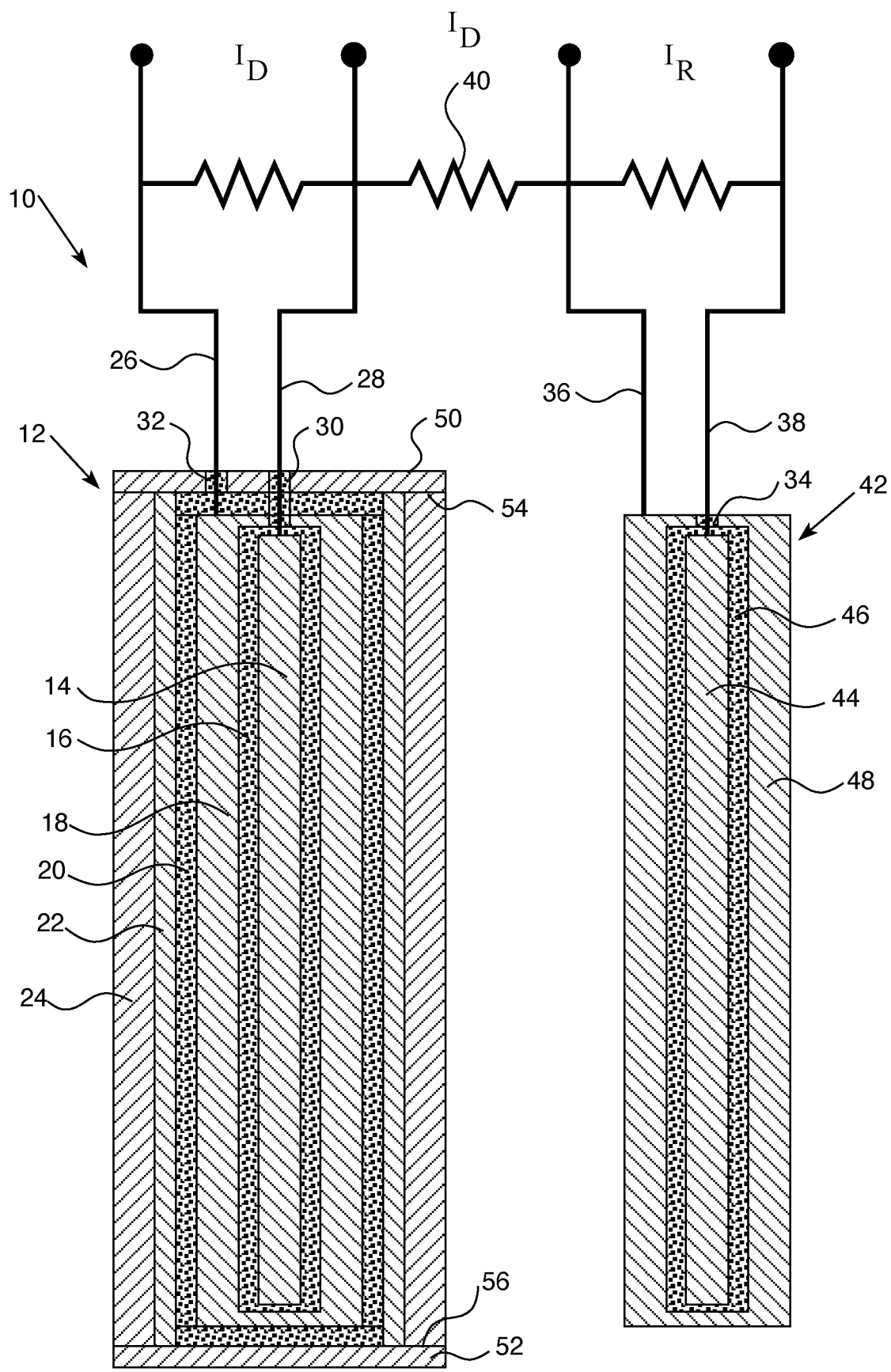

TEMPERATURE MEASUREMENT SENSOR USING MATERIAL WITH A TEMPERATURE DEPENDENT NEUTRON CAPTURE CROSS SECTION

BACKGROUND OF THE INVENTION

1. Field of the Invention

The invention relates to temperature detectors, and more particularly to self-powered neutron detectors for use in a nuclear reactor environment.

2. Description of the Prior Art

Temperature measurements in nuclear reactors are currently obtained using sensors, such as thermocouples or resistance temperature detectors (RTD).

SUMMARY OF THE INVENTION

The following summary is provided to facilitate an understanding of some of the innovative features unique to the embodiments disclosed and is not intended to be a full description. A full appreciation of the various aspects of the embodiments can be gained by taking the entire specification, claims, and abstract as a whole.

Various embodiments of a temperature sensor for use in a nuclear reactor environment are described herein. The operation of the sensor is based on the effect that Doppler temperature coefficient properties have on the neutron capture cross section of some materials.

A temperature measurement sensor for use in a nuclear reactor may generally include a first neutron detector member and a second neutron detector member wherein the first neutron detector member outputs a first current signal and the second neutron detector member outputs a second current signal. An electrical connection between the first and second signals produces the difference in current between the first and second signals. The difference is proportional to changes in temperature.

Each of the first and second members includes an inner electron emitter, a first layer of insulation surrounding the emitter, a charge collector surrounding the first layer of insulation, a negative charge output pin extending outwardly from the charge collector, and a positive charge output pin extending outwardly from the emitter. The first neutron detector member further includes a second layer of insulation surrounding the first neutron detector charge collector, an electron absorbing layer surrounding the second layer of insulation and an outer shield for capturing neutrons surrounding the electron absorbing layer.

In various aspects, each electron emitter is made of a material, for example, rhodium or vanadium, which absorbs neutrons from radioactive decay and emits electrons. The first and second layers of insulation may be made of one of aluminum oxide or magnesium oxide. The charge collectors, for example, may be made of steel, an Inconel® alloy, or combinations thereof. The electron absorbing layer, for example, may be made of aluminum, an Inconel® alloy, or combinations thereof. The shield material may be made of uranium 238, tungsten, or combinations thereof. Inconel® is a commercially available family of austenitic nickel-chromium-based or nickel-chromium-iron based alloys.

The difference in current between the first and second signals may be transmitted as a single signal to a receiver outside of the nuclear reactor. In various aspects, the difference in current signal is transmitted wirelessly. The sensor may be placed within a nuclear fuel rod. In various aspects, the difference in current signal is transmitted by a wired connection and the sensor is placed outside of a nuclear fuel rod.

In certain embodiments, the first and second members may be in the form of concentric cylinders, each defining an open central space surrounded by their respective inner emitter. In certain embodiments, the second member is positioned within the open central space of the first member. In certain other embodiments, the first and second members may be in the form of separate cylinders adjacent to each other.

The temperature sensor described herein may be used to continuously measure the temperature inside a fuel rod upper plenum by providing, in various aspects, a wireless data transmission methodology designed to convert electric current signals to radio frequency (RF) signals that can be received and easily converted to the appropriate engineering units. The device and methodology described herein allows temperature to be directly measured as a current signal proportional to the temperature surrounding the sensor device.

BRIEF DESCRIPTION OF THE DRAWINGS

The characteristics and advantages of the present disclosure may be better understood by reference to the accompanying figures.

The FIGURE shows a schematic representation of the temperature measurement device and output signals needed to produce a temperature measurement from the two neutron detector signals.

DESCRIPTION OF THE PREFERRED EMBODIMENTS

As used herein, the singular form of "a", "an", and "the" include the plural references unless the context clearly dictates otherwise. Thus, the articles "a" and "an" are used herein to refer to one or to more than one (i.e., to at least one) of the grammatical object of the article. By way of example, "an element" means one element or more than one element.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Further, any numerical range recited herein is intended to include all sub-ranges subsumed therein. For example, a range of "1 to 10" is intended to include any and all sub-ranges between (and including) the recited minimum value of 1 and the recited maximum value of 10, that is, having a minimum value equal to or greater than 1 and a maximum value of equal to or less than 10.

For the measurement of temperature inside a nuclear reactor, the temperature signal must be converted from voltage to current before transmission. A process more complex than heretofore available is needed.

Referring to the FIGURE, a schematic representation of an embodiment of the temperature sensor device 10 is shown with an exemplary output signal configuration. The sensor device 10 may be placed in the upper plenum of a nuclear fuel rod or in other regions within the reactor fuel assembly. In various aspects, the sensor device 10, as shown in the FIGURE, includes a first neutron detector member 12 and a second neutron detector member 42. The first member 12 includes an inner electron emitter 14, a first layer of insulation 16 surrounding the emitter 14, a charge collector 18 surrounding the first layer of insulation 16, a negative charge output pin 26 extending outwardly from the charge collector 18, and a positive charge output pin 28 extending outwardly from the emitter 14. Insulation 30 and 32 surrounds pins 28 and 26, respectively.

The first neutron detector member 12 also includes a second layer of insulation 20 surrounding the first neutron detector charge collector 18, an electron absorbing layer 22 surrounding the second layer of insulation 20 and an outer shield 24 for capturing neutrons surrounding the length of the electron absorbing layer 22. A top cap 50 extends over the top of the first member 12, including over the top edge 54 of the electron absorbing layer 22, and a bottom cap 52 extends over the bottom of the first member 12, including the bottom edge 52 of the electron absorbing layer 22. The top and bottom caps 50, 52 may also be made of an electron absorbing material.

The second member 42 includes an inner electron emitter 44, a first layer of insulation 46 surrounding the emitter 44, a charge collector 48 surrounding the first layer of insulation 46, a negative charge output pin 36 extending outwardly from the charge collector 48, and a positive charge output pin 38 extending outwardly from the emitter 44.

In various aspects, resistors 40 may provide the electrical connection between the first and second neutron detector members 12, 42. In use, the first neutron detector member 12 outputs a first current signal and the second neutron detector member 42 outputs a second current signal. The electrical connection between the first and second signals is capable of producing the difference in current between the first and second signals, wherein the difference is proportional to changes in temperature. This is achieved by using one output current to electrically buck out the other signal by connecting the signals such that current flow is in opposite directions.

In various aspects, the electron emitters 14, 44, are made of a material that absorbs neutrons from radioactive decay and emits electrons. The emitter material decays and emits electrons. Each electron emitter 14, 44 is therefore left with a positive charge signal passed through its respective positive output pin 28, 38. Exemplary emitter materials include rhodium and vanadium. The electrons emitted pass through the first insulating layers 16, 46, to the respective charge collectors 18, 48, resulting in an overall negative charge signal passed through negative output pins 26, 36. The first and second layers of insulation may be made of any suitable insulating material, such as aluminum oxide. The charge collector may, for example, be made of steel, Inconel® or combinations thereof. Inconel® refers to a family of alloys of austenitic nickel-chromium-based alloys that are well suited for extreme environments subjected to heat and pressure.

In the first detector member 12, the neutrons emitted from the fissile material in the fuel rod are captured by the outer shield 24, a material having a relatively large Doppler temperature neutron capture cross-section, for example, larger than the corresponding cross section of the emitter material. The electrons released are captured by the electron absorbing layer 22 so that they do not contribute to the negative charge signal from output pin 26. The outer shield material may be made of uranium 238 ($^{238}$U), tungsten (W), or combinations thereof. The electron absorbing layer, for example, may be made of aluminum, Inconel® or combinations thereof.

Those skilled in the art will recognize that other suitable emitting, insulating, charge collecting, electron absorbing, and shielding materials may be substituted in certain aspects for the materials identified herein.

The temperature sensor 10 as shown is configured as two self-powered neutron detectors 12, 42 in the form of wires or cylinders, with equal neutron sensitive volumes, for placement in regions in or near a nuclear fuel rod having essentially identical neutron flux and surrounding temperature. The value of $I_R$ shown in the FIGURE is the signal that would be measured by a typical self-powered neutron detector 42 for a given incident neutron flux. The value of $I_R$ is essentially unaffected by temperature changes in the surrounding environment. The value of I represents the signal output from a self-powered neutron detector 12 wrapped or surrounded by a material that has a neutron capture cross section greatly affected by neutron capture resonances for neutron energies above the optimum neutron capture cross section energy for the emitter material, such as $^{238}$U or W. The value of I will change with temperature changes surrounding the sensor device 10. As the temperature around the sensor device 10 changes, the value of I will change due to the Doppler neutron capture resonance broadening effect. The value of $I_R$ will not. Electrical communication between the two sensors is designated by resistors 40. The difference between the values of I and $I_R$, designated ($I_D$), will be proportional to the temperature change surrounding the sensor device 10. The transmission and use of the current difference between the two signals ($I_D$) to determine the surrounding temperature will allow discrimination of the changes in signal values caused by reactor power changes. This approach will also allow the temperature to be determined from a single current signal.

The relationship between temperature and detector output current is given by the expression:

$$T(t) = \frac{1}{\mu}\ln\left(\frac{-\ln\left(\frac{I(t)}{I(t_0)}\right)}{d\Sigma(T_o)}\right)$$

$$I(t) = I(t_o)e^{-d\Sigma_c(T_o)}$$

Where:
d=thickness of detector wrapper
$\Sigma_c$=Macroscopic neutron capture cross section of the detector wrapper material
$T_o$=initial temperature
$t_o$=initial time
t=current time
And: $\Sigma_c(T)=\Sigma_c(T_o)e^{\mu T(t)}$ The sensitivity is given by the derivative of the expression for I(t) as a function of temperature:

$$\frac{dI(t)}{dT(t)} = -I(t_o)d\frac{d\Sigma(T)}{dT}e^{-d\Sigma_c(T)}$$

And:

$$\frac{d\Sigma(T)}{dT} = \Sigma(T_o)\mu e^{\mu T(t)}$$

The sensitivity is maximized by maximizing $\mu$, $I(t_0)$, and d. Specifically, the sensitivity is maximized if:

$\mu T > d\Sigma_c(T)$.

In various aspects, the sensor device 10 may be placed outside of, but near the nuclear fuel rod. If wires are used by the sensor device 10, the wires may be interlaced in a spiral that runs along the inside (or outside) of the cladding wall of the nuclear fuel rod (not shown). If the nuclear fuel pellets (not shown) have a hollow central annulus, the interlaced wires may be inserted into the annulus. The wires run outside of the core and are connected to a meter. Standard commercially available current measurement tools may be used with a wired sensor device 10.

In various aspects, the sensor device 10 may be placed within the nuclear fuel rod. Temperature measurements maybe obtained inside the nuclear reactor core and associated fuel rods by wireless transmission from inside the reactor vessel to a receiver located outside of the reactor. An exemplary wireless transmission system is disclosed in Seidel, "Wireless In-Core Neutron Monitor", U.S. Pat. No. 8,767,903 B2, incorporated herein by reference.

In the embodiment shown in the FIGURE, the first and second members 12, 42 are in the form of separate cylinders adjacent to each other. In other aspects, the first and second members 12, 42 may be in the form of concentric cylinders each defining an open central space surrounded by their respective inner emitter, and wherein the second member 42 is positioned within the open central space of the first member 12.

As stated herein, the operation of the temperature sensor device 10 is based on the effect that Doppler temperature coefficient properties have on the neutron capture cross section of some materials. The Doppler coefficient is the change in reactivity per degree of change in temperature of nuclear fuel. For example, the outer shield 24 of the first detector member 12 will absorb neutrons from the fissile material in the reactor. When a material such as uranium 238 is used as the outer shield 24, the number of fission spectrum neutrons that are transmitted through the thickness of the uranium 238 material will decrease as the temperature increases due to temperature induced increase (broadening) of the effective neutron capture cross section in the epithermal neutron capture resonances. Fewer neutrons are allowed to thermalize and contribute to the fission rate in the fissionable material in the reactor. This decrease in the neutron population decreases the signal output from neutron detectors that rely on the neutrons with energies captured in the neutron capture resonances of the intervening outer shield 24 material. This results in a reduced signal output from the neutron sensor 12 even though the fission source neutron population has not changed. The change in the neutron sensor output signal will be proportional to the change in the temperature in the intervening material. This relationship between temperature and output signal can be established both theoretically and by a measured calibration process. This process will allow temperature in a desired location inside a nuclear reactor core to be measured using well established signal processing methods.

The present invention has been described in accordance with several examples, which are intended to be illustrative in all aspects rather than restrictive. Thus, the present invention is capable of many variations in detailed implementation, which may be derived from the description contained herein by a person of ordinary skill in the art.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. A temperature measurement sensor for use in a nuclear reactor, the temperature measurement sensor comprising:
   a first neutron detector member; and
   a second neutron detector member;
   each of the first and second neutron detector members comprising an inner electron emitter, a first layer of insulation surrounding the inner electron emitter, a charge collector surrounding the first layer of insulation, a negative charge output pin extending outwardly from the charge collector, and a positive charge output pin extending outwardly from the inner electron emitter;
   wherein the inner electron emitter of the first neutron detector member comprises a first electron emitter material;

wherein the inner electron emitter of the second neutron detector member comprises a second electron emitter material;

wherein the first electron emitter material and the second electron emitter material are the same;

wherein the first neutron detector member further comprises a second layer of insulation surrounding the charge collector of the first neutron detector member, an electron absorbing layer surrounding the second layer of insulation, and an outer shield comprising an outer shield material for capturing neutrons surrounding the electron absorbing layer;

wherein the effective neutron capture cross section of the outer shield material is temperature dependent;

wherein in use, the first neutron detector member outputs a first current signal and the second neutron detector member outputs a second current signal; and an electrical connection between the first and second neutron detector members, the electrical connection configured to produce a difference in current between the first and second current signals, wherein the difference in current is based on the outer shield material, and wherein the difference in current is proportional to changes in temperature.

2. The sensor recited in claim 1 wherein each of the first electron emitter material and the second electron emitter material absorbs neutrons from radioactive decay and emits electrons.

3. The sensor recited in claim 2 wherein each of the first electron emitter material and the second electron emitter material is selected from the group consisting of rhodium and vanadium.

4. The sensor recited in claim 1 wherein each of the first and second layers of insulation are made of one of aluminum oxide or magnesium oxide.

5. The sensor recited in claim 1 wherein each charge collector is made of a material comprising at least one of steel, an austenitic nickel-chromium-based alloy, an austenitic nickel-chromium-iron based alloy, or combinations thereof.

6. The sensor recited in claim 1 wherein the electron absorbing layer is made of a material comprising at least one of aluminum, an austenitic nickel-chromium-based alloy, an austenitic nickel-chromium-iron based alloy, or combinations thereof.

7. The sensor recited in claim 1 wherein the effective neutron capture cross section of the outer shield material is larger than the effective neutron capture cross section of the first and second electron emitter material.

8. The sensor recited in claim 7 wherein the outer shield material is selected from the group consisting of uranium 238, tungsten, and combinations thereof.

9. The sensor recited in claim 1 further comprising a transmitter to transmit the difference in current between the first and second current signals as a single signal to a receiver outside of the nuclear reactor.

10. The sensor recited in claim 9 wherein the transmitter comprises a wireless transmitter to wirelessly transmit the single signal to the receiver outside of the nuclear reactor.

11. The sensor recited in claim 10 wherein the sensor is configured to be placed within a nuclear fuel rod.

12. The sensor recited in claim 9 wherein the transmitter comprises a wire transmitter to transmit the single signal to the receiver outside of the nuclear reactor.

13. The sensor recited in claim 12 wherein the sensor is configured to be placed outside of a nuclear fuel rod in the nuclear reactor.

14. The sensor recited in claim 1 wherein the first and second neutron detector members are in the form of concentric cylinders.

15. The sensor recited in claim 1 wherein the first and second neutron detector members are separate cylinders adjacent to each other.

16. The sensor recited in claim 1 wherein the inner electron emitter of the first neutron detector member comprises a first neutron sensitive volume;

wherein the inner electron emitter of the second neutron detector member comprises a second electron emitter volume;

wherein the first electron emitter volume and the second electron emitter volume are equal.

17. The sensor recited in claim 1 wherein the outer shield material comprises a first Doppler temperature coefficient;

wherein the first and second electron emitter material comprise a second Doppler temperature coefficient; and wherein the first Doppler temperature coefficient is greater than the second Doppler temperature coefficient.

18. The sensor recited in claim 1 further comprising a current measurement tool to measure the difference in current between the first and second current signals.

* * * * *